Dec. 29, 1925.  W. I. BETTIS  1,567,829
BIT
Filed Jan. 28, 1924
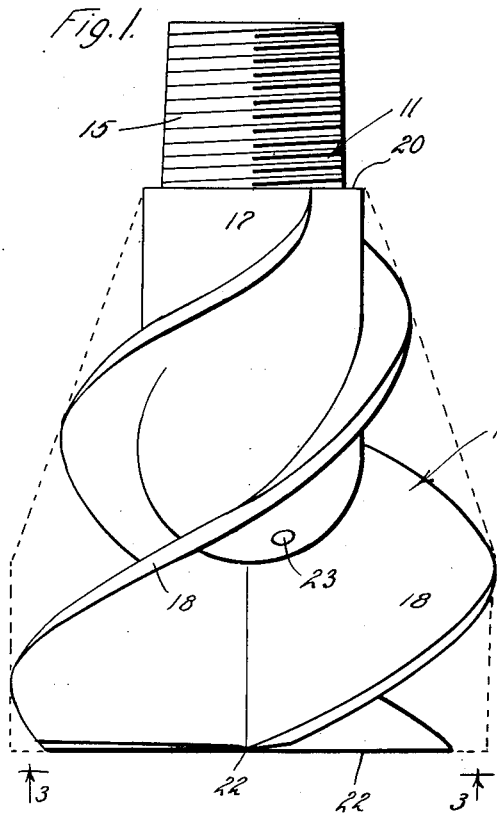
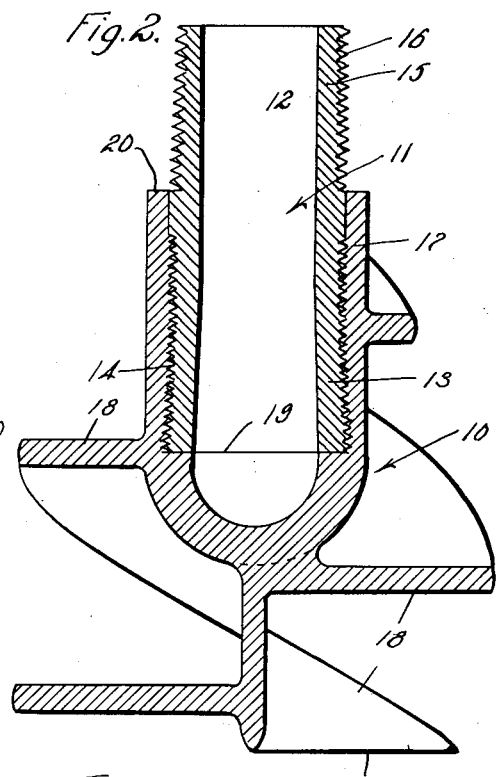
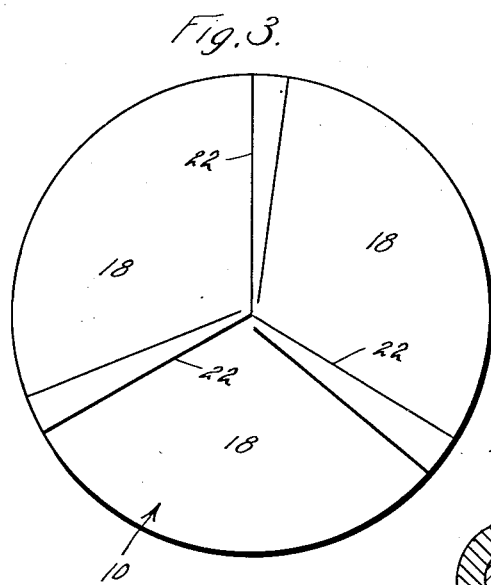
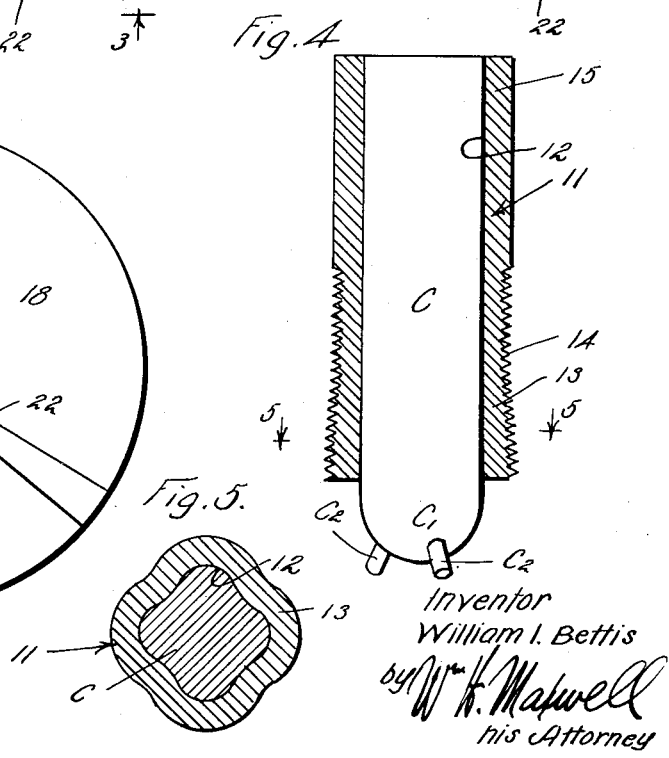
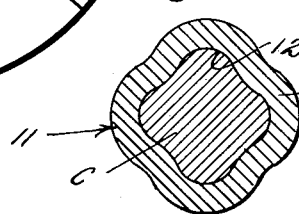
Inventor
William I. Bettis
his Attorney Patented Dec. 29, 1925.

1,567,829

UNITED STATES PATENT OFFICE.

WILLIAM I. BETTIS, OF LOS ANGELES, CALIFORNIA.

BIT.

Application filed January 28, 1924. Serial No. 688,948.

*To all whom it may concern:*

Be it known that I, WILLIAM I. BETTIS, a citizen of the United States, and a resident of Los Angeles, county of Los Angeles, State of California, have invented new and useful Improvements in Bits, of which the following is a specification.

This invention has to do with a bit, it being an object of the invention to provide an effective, durable and economical bit particularly useful in drilling wells.

It is an object of this invention to provide a simple, effective bit having an extremely hard durable cutting part, and a workable or machinable shank.

Another object of this invention is to provide a simple, strong and practical construction for a bit of the character specified.

The various objects and features of my invention will be best and more fully understood from the following detailed description of a typical form and carrying out of my invention, throughout which description reference is had to the accompanying drawings, in which:

Fig. 1 is a side elevation of the bit provided by my invention;

Fig. 2 is a vertical detail sectional view of the bit;

Fig. 3 is an end view of the bit, being a view taken as indicated by the line 3—3 on Fig. 1;

Fig. 4 is a detail sectional view of the shank of the bit, showing a core in it, and Fig. 5 is a transverse sectional view, taken as indicated by the line 5—5 on Fig. 4.

The bit provided by my invention includes, in its preferred form, only two parts: a cutting part 10, and a shank 11.

The shank 11 may be formed of an elongate body of machinable steel or other suitable metal, having an opening 12 extending longitudinally through it. When I use the term "machinable metal" I mean a metal which is capable of being cut or worked, for instance, in a lathe or other machine. In practice it is preferred that the shank be round in cross sectional configuration, and that the opening 12 be a centrally located round opening comparatively large in diameter. A piece of round tubular bar or a piece of heavy tubing may be advantageously used in forming the shank 11. The lower portion 13 of the shank 11 is preferably deformed, say, for example, somewhat distorted or roughened, for purposes which will appear from the description to follow. In the drawings I have illustrated the end of the lower portion somewhat expanded and corrugated, and the outer surface of the lower portion roughened by screw threads 14. The upper portion 15 of the shank is in the finished bit, machined or otherwise finished, so that it is attachable to a suitable operating part. In the drawings, I have illustrated the upper portion of the shank provided on its outer surface with screw threads 16, so that it is attachable to a tool joint section or other suitable part.

The cutting part 10 is, in accordance with my invention, a casting, of extremely hard durable steel or other metal, for example, manganese steel. When I use the term "hard metal" I mean a metal such as manganese steel which is too hard to be machined or worked with ordinary equipment. The cutting part includes, generally, a body 17, and blades 18 extending from the body. The body 17 is tubular in form, and is carried on the lower portion 13 of the shank 11. The body 17 preferably extends somewhat beyond the lower end of the part 13, and is closed at its lower end, as I have clearly illustrated in Fig 2 of the drawings. In accordance with my invention the body 17 may be cast onto the lower portion 13 of the shank so that it is permanently and rigidly connected thereto. The body 17 is cast onto the lower portion of the shank so that the upper portion 15 of the shank extends freely upwardly from or beyond the upper end of the body. The body is provided in its interior and near its lower end with a shoulder 19, which engages or receives the lower end of the shank. The upper end 20 of the body 17 may be smooth and flat to present a shoulder to be engaged by a tool joint section or other part connected to the shank.

The blades 18 are helical in form and are formed on or around the longitudinal axis of the body 17. There are, preferably, two or more blades 18, equally spaced around the axis, as I have illustrated in the drawings. The angularity or pitch of the blades may, in practice, be varied to suit the conditions or formation to be encountered by the bit, it being desirable under ordinary conditions to pitch them at an angle of about thirty degrees. The blades 18 project downwardly beyond the lower end of the body 17, and outwardly beyond the sides of the body. The blades are, of course, joined or formed integrally with the body 17, and have their inner parts joined or connected together below the lower end of the body 17. In accordance with the preferred form of construction the blades extend around and along the body to its upper end and thereby form braces or ribs to strengthen and reenforce the body. The portions of the blades below the lower end of the body are preferably of uniform width or diameter, while the portions of the blades between the ends of the body vary in width or diameter. The blades decrease in width or diameter from the lower end of the body to the upper end of the body. By shaping the blades in this manner the cutter has an outline or profile such as I have illustrated in dotted lines in Fig. 1. This formation is particularly significant in that it makes the back or upper side of the cutter pointed or tapered so that it offers a minimum amount of resistance to upward movement, for instance, to withdrawal from the hole; and, further, causes objects to be pushed or guided to one side rather than caught when the bit is moved upwardly. The blades 18 are provided at their lower ends with cutting edges 22, which may be formed by dressing away the undersides of the blades at their lower ends. In the form of the invention illustrated in the drawings the several cutting edges are located in a common horizontal plane and are uniformly shaped.

In accordance with my invention circulation openings or holes 23 are formed in or through the lower end of the body 17 so that they are open to or in communication with the opening in the shank. The circulation openings 23 are preferably located in the end of the body so that they will direct or discharge fluid delivered to them from the shank downwardly to the cutting edges of the blades. In practice I provide a circulation opening 23 for each blade. By providing the openings 23 in the body 17 the bit is made useful for drilling with the rotary method, in which case fluid is pumped downwardly to the bit where it is discharged to circulate up through the hole with the cuttings. By locating the openings 23 in the proper manner the fluid is directed onto the blades so that it keeps them clean, and thus greatly aids the operation of the bit.

In accordance with my method of making the bit I have just described, I employ a tubular body of machinable metal, for instance, a piece of heavy tubing, for the shank. The shank is, of course, cut to the desired length, and its outward dimension is preferably about that of the shank in the finished bit. The lower end portion of this body of machinable metal is cleaned of any oxide, or the like, by any suitable method, and is preferably deformed, for instance, by expanding it, and, possibly, corrugating it, or forming threads in its outer surface. A core C of sand, or other suitable material, is made or placed in the opening in the shank so that it closes the lower end of the shank, and preferably has a part $C^1$, which is rounded and projects somewhat beyond the lower end of the shank. A mold is prepared, for instance, in sand, to cast a body of metal in the form of the cutter of the bit, and the shank carrying the core C is arranged in this mold so that the shank bears the same relation to the impression in the mold as it does to the cutter in the finished bit. Cores $C^2$ are arranged in the mold in the position of the openings 23. These cores may be formed on or with the core C, or may be entirely separate from the core C. The mold is poured with a hard metal, such as manganese steel, so that a body or cutter of this hard steel is cast onto or around the lower end of the shank. The cutter casts onto the shank without cracking, in that the shank is more or less compressible due to the opening through it. Further, the blades of the cutter, in extending along and around the body, form ribs which strengthen it and tie its various parts together both longitudinally and circumferentially. The cutter, when removed from the mold, is finished except for dressing the cutting edges of the blades, which may be done by grinding, and for finishing the projecting or upper end portion of the shank if this was not done before the casting operation. It is desirable, in practice, to finish the projecting portion of the shank after the cutter is cast, as it can then be finished perfectly true with relation to the cutter. The bit may be heat-treated to remove shrinkage strains.

From the foregoing description it will be apparent that I have provided a bit which is extremely simple and inexpensive to manufacture, and that I have provided a bit with a machinable or workable shank and an extremely hard or practically unworkable cutting part in which these parts are united or connected in a permanent and rigid manner. Further, the blades of my cutter, in being located and dressed, as I have hereinabove described, will not dig or bite into a formation too fast as will an ordinary drilling bit, for instance, a bit of the fish tail type. Further, by disposing the blades as I have described the strains that come upon them during drilling will not break them in that the planes of the blades are at a comparatively small angle to the plane of the cut.

Having described only a typical preferred form of my invention I do not wish to limit myself to the specific details hereinabove set forth but wish to reserve to myself any changes or variations that may appear to those skilled in the art or fall within the scope of the following claims.

Having described my invention, I claim:

1. A bit of the character described including, a unitary structure comprising a shank of machinable metal, and a cutter of hard metal on one end of the shank, the cutter including a body engaging the shank and a helical blade integral with the body and extending from a point beyond the lower end of the body to the upper end of the body.

2. A bit of the character described including, a cutter including a body and a plurality of helical blades extending around the body and projecting from its lower end, the blades being substantially uniform in diameter below the end of the body and decreasing in diameter from the lower end of the body to the upper end of the body.

3. A bit of the character described including, a tubular body of machinable metal having a deformed lower portion and a screw threaded upper portion, a cutter of hard metal carried by the lower portion of the shank, the cutter including a tubular body engaging around the lower portion of the shank and a plurality of helical blades extending around the body about the axis of the body and projecting below the lower end of the body, the blades being substantially uniform in diameter below the lower end of the body and decreasing in diameter from the lower end of the body to the upper end of the body, the body having openings through its lower end communicating with the opening in the shank.

In witness that I claim the foregoing I have hereunto subscribed my name this 15th day of January, 1924.

WILLIAM I. BETTIS.